US010347894B2

(12) United States Patent
Barton et al.

(10) Patent No.: US 10,347,894 B2
(45) Date of Patent: Jul. 9, 2019

(54) ENERGY STORAGE SYSTEM

(71) Applicant: Tesla Motors, Inc., Palo Alto, CA (US)

(72) Inventors: Augusto E. Barton, Palo Alto, CA (US); Robert Clinton Lane, Redwood City, CA (US); Nathan Khalil Chidiac, Los Altos, CA (US); Julian Christian Carl, Amsterdam-Zuidoost (NL); Hugh Burnett Ross, San Francisco, CA (US); William B. Stockton, San Francisco, CA (US); Nicholas Paul Manov, Mountain View, CA (US)

(73) Assignee: TESLA, INC., Palo Alto, CA (US)

( * ) Notice: Subject to any disclaimer, the term of this patent is extended or adjusted under 35 U.S.C. 154(b) by 0 days.

(21) Appl. No.: 15/411,154

(22) Filed: Jan. 20, 2017

(65) Prior Publication Data

US 2018/0212222 A1 Jul. 26, 2018

(51) Int. Cl.
*H01M 2/10* (2006.01)
*H01M 2/12* (2006.01)
(Continued)

(52) U.S. Cl.
CPC ......... *H01M 2/206* (2013.01); *H01M 2/1077* (2013.01); *H01M 2/1094* (2013.01);
(Continued)

(58) Field of Classification Search
CPC ......... H01M 10/6556; H01M 10/6554; H01M 10/643; H01M 2/10; H01M 2/1077
See application file for complete search history.

(56) References Cited

U.S. PATENT DOCUMENTS

2005/0170241 A1 8/2005 German et al.
2009/0208829 A1 8/2009 Howard
(Continued)

FOREIGN PATENT DOCUMENTS

CN 205752451 U 11/2016
EP 2800165 A1 11/2014

OTHER PUBLICATIONS

International Searching Authority; International Search Report and Written Opinion; International Application No. PCT/IB2018/050344; dated Jul. 17, 2018; 17 pgs.
(Continued)

*Primary Examiner* — Karie O'Neill Apicella
(74) *Attorney, Agent, or Firm* — Garlick & Markison; Kelly Hale; Bruce Garlick

(57) ABSTRACT

An energy storage system includes a module housing and multiple battery cells positioned inside the module housing. Each of the battery cells has a first end and a second end. Further, each of the battery cells has a positive terminal and a negative terminal. The energy storage system includes a first interconnect and a second interconnect positioned over the battery cells. Multiple first cell connectors connect the positive terminals of the battery cells to the first interconnect. Multiple second cell connectors connect the negative terminals of the battery cells to the second interconnect. A top plate having an interior side and an exterior side is positioned over the first interconnect and the second interconnect. The top plate includes one or more weak areas positioned above one or more battery cell.

11 Claims, 16 Drawing Sheets

(51) Int. Cl.
*H01M 2/20* (2006.01)
*H01M 10/04* (2006.01)
*H01M 10/613* (2014.01)
*H01M 10/6552* (2014.01)
*H01M 10/643* (2014.01)
*H01M 10/6554* (2014.01)

(52) U.S. Cl.
CPC ..... *H01M 2/1241* (2013.01); *H01M 10/0422* (2013.01); *H01M 10/613* (2015.04); *H01M 10/643* (2015.04); *H01M 10/6552* (2015.04); *H01M 10/6554* (2015.04)

(56) References Cited

U.S. PATENT DOCUMENTS

| 2011/0212355 | A1 | 9/2011 | Essinger et al. | |
|---|---|---|---|---|
| 2012/0231309 | A1* | 9/2012 | Itoi | H01M 2/1077 429/99 |
| 2015/0111082 | A1 | 4/2015 | Sumpf et al. | |
| 2015/0221914 | A1† | 8/2015 | Page | |
| 2015/0244036 | A1 | 8/2015 | Lane | |
| 2017/0018750 | A1 | 1/2017 | Wintner | |
| 2017/0092909 | A1* | 3/2017 | Motokawa | H01M 10/625 |

OTHER PUBLICATIONS

International Search Authority; International Application No. PCT/IB2018/050344; Invitation to Pay Fees and, Where Applicable, Protest Fee; Partial International Search Report; dated Apr. 23, 2018; 11 pgs.

International Searching Authority; International Search Report and Written Opinion; International Application No. PCT/IB2018/050158; dated Apr. 12, 2018; 12 pgs.

\* cited by examiner
† cited by third party

ENERGY STORAGE SYSTEM

TECHNICAL FIELD

The present disclosure relates to an energy storage system. More particularly, the present disclosure relates to structural and electrical aspects of the energy storage system.

BACKGROUND

Energy storage systems are used in a variety of contexts. For example, an electrical storage system can be used to store energy generated from photovoltaics. The energy storage systems of the present disclosure include "packs" of multiple cells stacked together. These cells and other components in a pack generate heat during operation, both during the charging process to store the energy and during the discharge process when energy is consumed. When the cells fail, they typically release hot gases. These gases may impact the integrity of other cells in the pack and may cause substantial damage to the functional cells which have not failed. Thus, an improved energy storage system is required which reduces or removes one or more of the issues mentioned.

Figure 1A:
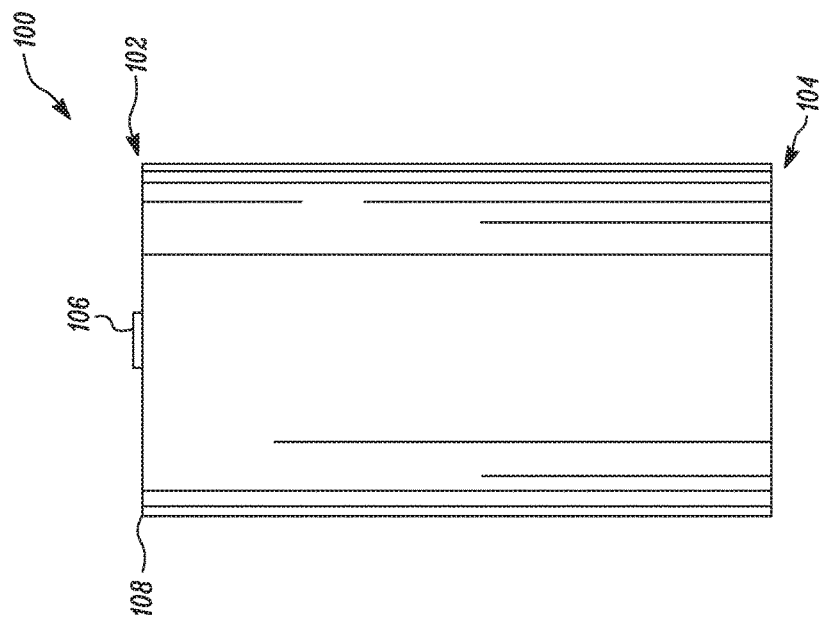
FIG. 1A illustrates a perspective view of a battery cell, according to certain embodiments of the invention.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure relates to an energy storage system. More particularly, the present disclosure relates to structural aspects of the energy storage system.

The energy storage system includes a module housing having multiple battery cells positioned inside the module housing. Each of the battery cells has a first end and a second end. Further, each of the battery cells has a positive terminal and a negative terminal. A first interconnect is positioned over the multiple battery cells. A second interconnect is positioned over the multiple battery cells. Multiple first cell connectors connect the positive terminal of the battery cells to the first interconnect. Similarly, multiple second cell connectors connect the negative terminal of the battery cells to the second interconnect. A top plate having an interior side and an exterior side is positioned over the first interconnect and the second interconnect. The top plate includes one or more weak areas above the one or more battery cell. The weak areas are regions that have less integrity and thus, where mechanical failure is more likely to occur if a battery cell releases gas. These regions may be physically weaker areas compared to the surrounding areas and may rupture when pressure builds up due to a failed cell. Alternatively, the weak areas may be chemically weaker and preferentially rupture when exposed to the caustic gases released by a failed battery cell. The weak areas may also fail due to a combination of physical and chemical weakening.

Aspects of the present inventions are described below in detail to specific aspects or features with certain examples illustrated in the accompanying drawings. Wherever possible, corresponding or similar reference numbers will be used throughout the drawings to refer to the same or corresponding parts.

Figure 1B:
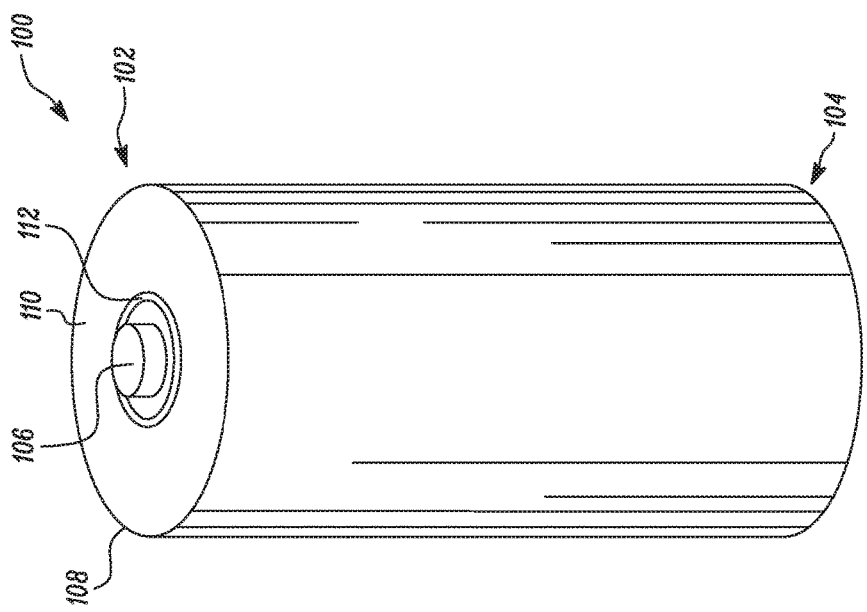
FIG. 1B illustrates a side view of a battery cell, according to certain embodiments of the invention.

FIG. 1 illustrates a battery cell 100 in a perspective view through FIG. 1A, and in a side view through FIG. 1B. With combined reference to FIGS. 1A and 1B, the battery cell 100 may be any type of a conventional battery cell which may convert chemical energy of substances stored in the battery cell 100 into electrical energy. The battery cell 100 has a first end 102 and a second end 104. The battery cell 100 has a positive terminal 106 and a negative terminal 108 towards the first end 102. The positive terminal 106 preferentially protrudes from the first end 102 the battery cell 100 to allow a contact to be made to the positive terminal 106 and differentiate the first end 102 from the second end 104, although different geometries of the positive terminal 106 may exist. The negative terminal 108 preferentially begins on the second end 104 and continues on the outer surface 110 of the battery cell 100 and wraps at least to a portion of first end 102. The portion of the battery cell 100 that wraps from the outer surface to the first end may be referred to the "shoulder" of the battery cell 100. The negative terminal 108 preferentially is formed on the shoulder, so that connections to the negative terminal may be made on the shoulder. In other words, the negative terminal 108 preferentially exists on shoulder of the battery cell 100. An insulation region 112 may be provided on the surface 110 of the battery cell 100 such that the positive terminal 106 and the negative terminal 108 do not short due to mutual contact. The insulating region 112 may be provide through any other means as well on area of the surface 110 between the positive terminal 106 and the negative terminal 108. In alternate embodiments, the positive and negative terminals could be switched.

Figure 2:
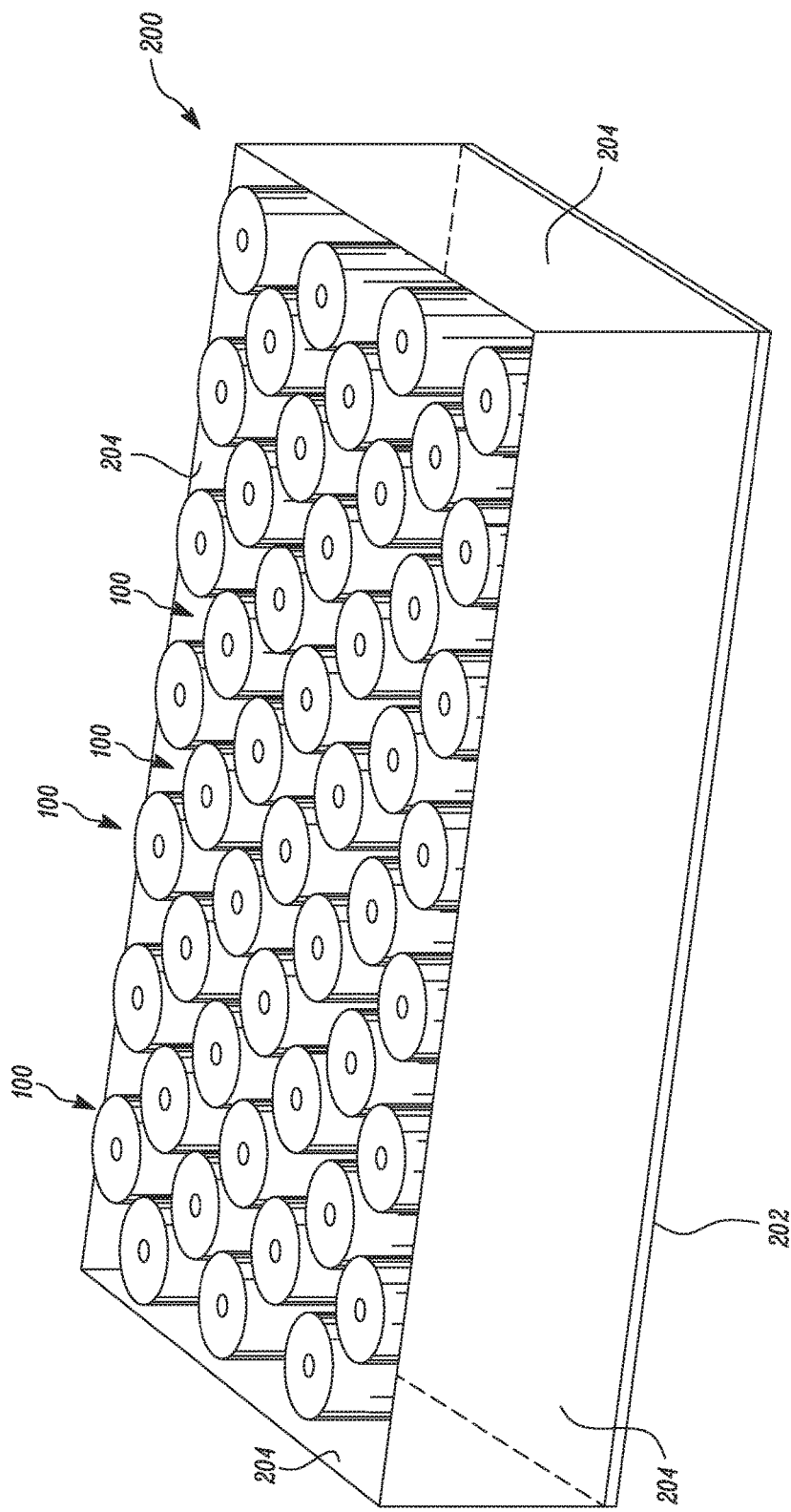
FIG. 2 illustrates a perspective view of an array of battery cells positioned inside a module housing, according to certain embodiments of the invention.

FIG. 2 illustrates an array of battery cells 100 positioned inside a module housing 200. The module housing 200 may be a box shaped enclosure which may have means to accommodate the battery cells 100 in an upright manner as illustrated. According to certain embodiments of this invention, the module housing 200 includes a base 202 and four side walls 204 supported on the base 202. The side walls 204 may be attached to the base 202 through any suitable mechanical joining means such as fasteners, adhesives etc. The module housing 200 may be an integral box shaped structure as well. The base 202 of the module housing 200 may include slots or any other such means (not shown) to accurately position the battery cells 100 inside the module housing 200. The modular housing may include active cooling or electrical elements.

Figure 10:
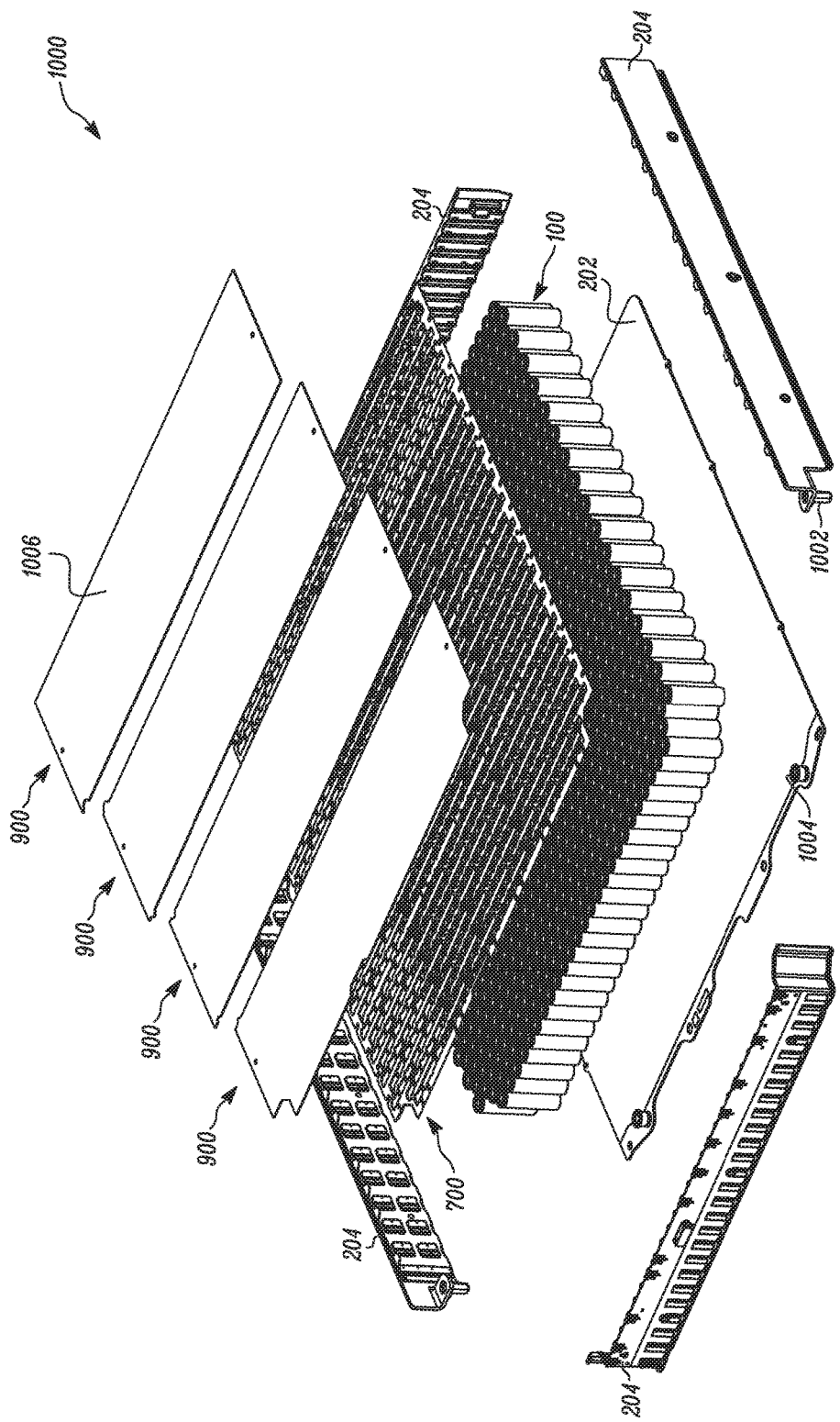
FIG. 10 illustrates an exploded view of the energy storage system, according to certain embodiments of the invention.

Battery cells 100 are preferentially positioned in a uniform direction within the module housing 200 such that the first end 102 of the battery cell 100 is facing towards top plate 900 as shown in FIG. 10 and the second ends 104 of the battery cells 100 are facing away from top plate 900 and towards the base 202. The base may comprise a cold plate or simply be a non-cooled plate. The base may be insulated so to prevent the formation of an electrical connection between battery cells 100 through the base or other portions of the module housing. The battery cells 100 may be arranged in different orientations as dictated by the geometrical and design constraints of the system. The battery cells 100 may be arranged in rows and columns as illustrated or the battery cells 100 may also be arranged in any other manner of stacking based on number of the battery cells 100 being used as per application requirements.

During operation of the energy storage system, the battery cells 100 generate heat. The system may include features or material to thermally insulate the battery cells 100 from the heat generated by other cells (and/or other electrical components), such as a polymer-based insulating material or another type of insulating material. The system may also include features, such as a cold plate or heat pipes, to remove heat generated by the battery cells 100 during operation of the energy storage system. The negative terminal of the battery cells 100 may exist on the side of the cells. It may therefore be desirable to electrically insulate the battery cells 100 from each other. The energy storage system may include features or material to electrically insulate the battery cells from each other and other electrical components for which an electrical connection is not desired. The features or material to perform this electrical insulation may include the interstitial material or a sleeve, as further described below. In alternate embodiments, an air gap may provide the necessary electrical isolation.

Further, the battery cells 100 may fail and discharge its contents as hot gases that are caustic to the other battery cells 100 and other portions of the system. The energy storage system may include features or material for directing the hot-gas discharge during failure of a battery cell 100. In certain embodiments, the features or material for insulating the battery cells from heat generated by other battery cells (and/or other electrical components) and the feature or material that directs the discharge of the hot gases during battery cell failure may be the same. In other embodiments, separate features or materials may both insulate a battery cell from the other battery cells and also direct the discharge of any hot gases. The insulation material or feature may be interstitial material 300 (shown in FIG. 3) or sleeve 400 (shown in FIG. 4). Similarly, the feature or material for directing the discharge of hot gases may be interstitial material 300 or a sleeve 400.

Figure 3:
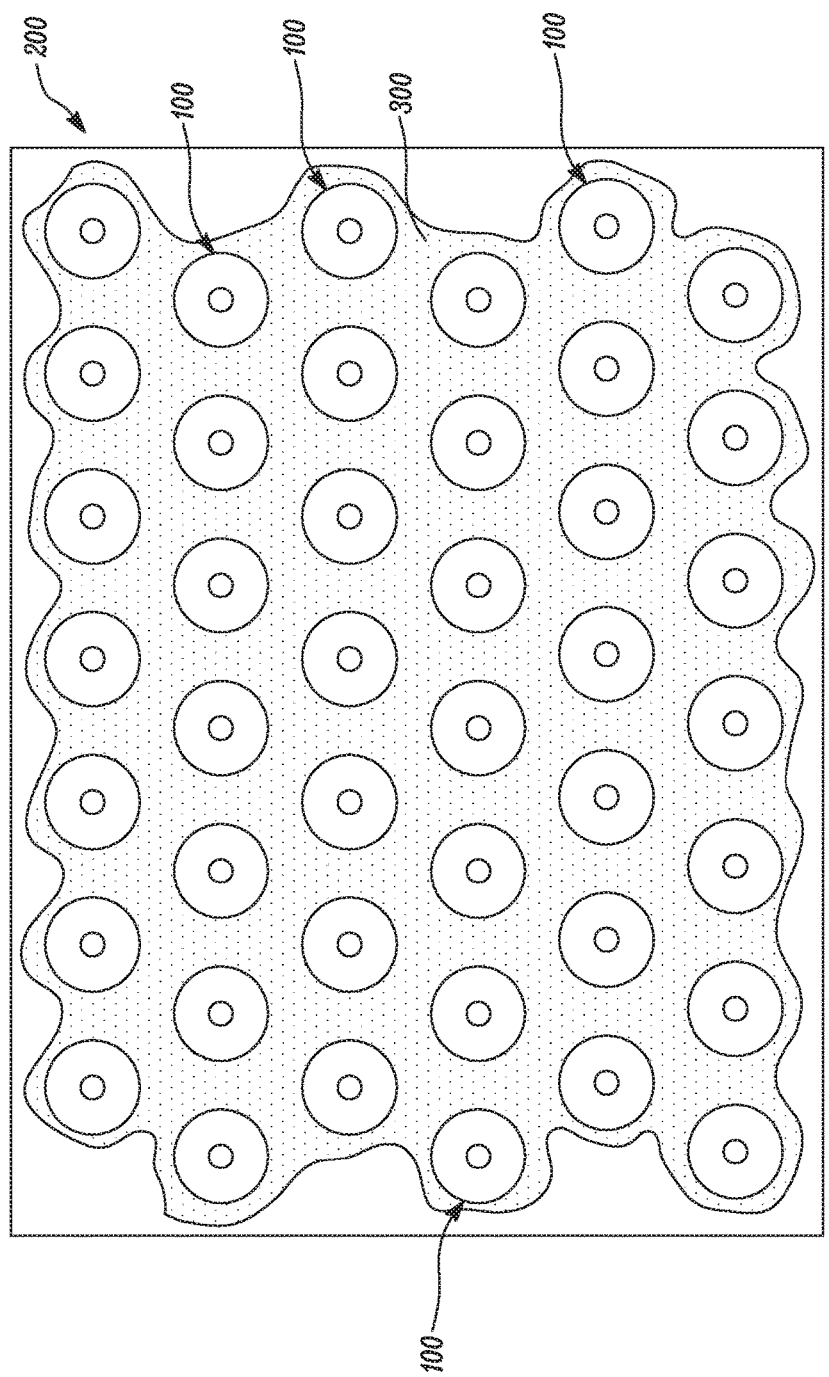
FIG. 3 illustrates a top view of the array of battery cells having an interstitial material placed between the battery cells, according to certain embodiments of the invention.

FIG. 3 illustrates a top-down view of the array of battery cells 100 with the interstitial material 300 between the battery cells 100. The interstitial material 300 may thermally insulate the battery cells 100 from the heat generated by other battery cells 100 and may also electrically insulate the battery cells 100 from each other, which may be necessary as the negative terminal may exist on side of a battery cell. The interstitial material 300 may also direct any discharge generated from failure of the battery cells 100 away from the other battery cells 100.

Separate materials may also be used to thermally and/or electrically insulate the battery cells 100 and directing the discharge generated from failure of the battery cells 100 away from the array of the battery cells 100. For example, this could occur by providing a first interstitial material around the cells that is thermally and/or electrically isolating. If this material is insufficient to fully direct any hot-gas discharge from a failed cell, for example, due to the porosity of the material, then a second interstitial material may be disposed around the first interstitial material to cause the desired discharge direction.

The interstitial material 300 may be selected from a variety of materials including, but not limited to, thermally insulating materials in the form of foams, fabrics, battings, intumescent materials, and related insulation materials known in the art of thermal insulation. This includes polymeric foams such as silicones, epoxies, urethanes, polyimides, aromatic polyethers and sulfones, and phenolic foams—materials generally known as having high thermal stability. It additionally includes syntactic foams (resin-based materials with hollow mircobubble filler) formed from the same classes of polymers. This can be extended to include bound assemblies of insulating particles (like microbubbles) bound together with a binder rather than fully immersed in a resin matrix. It also includes non-polymeric foams such as aerogels and porous ceramics. Fabrics and battings include ceramic and glass fiber felts, papers, fabrics, and battings. Intumescent materials, which are materials that expand and char in the presence of heat, can be incorporated either as a free-standing fill material, or incorporated into the above options of foams, syntactic foams, or fabric-like materials. As such, the fill material can be a combination of above mentioned classes of materials. The fill material can be further enhanced by the incorporation of flame suppressant and fire retardant materials known in the art fire-resistance.

The interstitial material 300 may be disposed in spaces between the battery cells 100 in the module housing 200 by adding the material through ports in one or more side walls 204 of modular housing. Alternatively, the material may be added from the top, after battery cells have been placed into position within the modular housing, excluding the top plate. Additional approaches of incorporating the fill material include placing preformed inserts of thermal insulation into the interstitial gaps during assembly, or after cell assembly but before the final enclosure is closed. When a multiple types of interstitial materials are used, other techniques may be used. For instance, the first interstitial material may be coated through, for example, dip coating or spin coating, followed by the addition of the second material through a coating technique or adding the interstitial material through a port in the side wall or from the top, after the battery cells have been placed into position within the modular housing, excluding the top plate.

Figure 4:
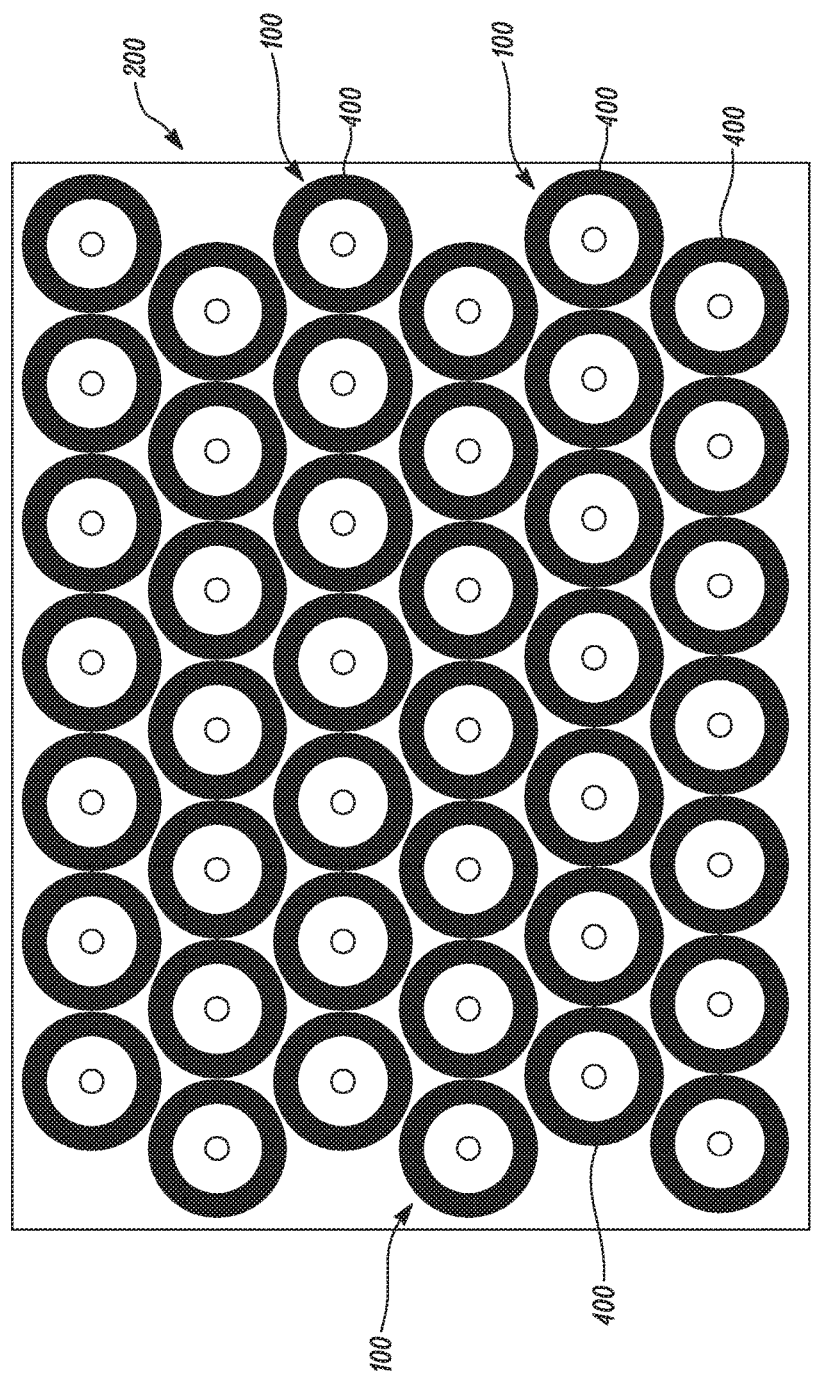
FIG. 4 illustrates a top view of the array of battery cells having sleeves placed around the battery cells, according to certain embodiments of the invention.

FIG. 4 illustrates a top-down view of another embodiment of the present invention with sleeves around the battery cells. Sleeves 400 are preferentially provided around one or more battery cells 100. In certain embodiments, sleeves may be provided around every battery cell 100. In alternate embodiments, sleeves may be provided around less than every battery cell 100, but such that each battery cells is electrically and/or thermally isolated from one another.

Sleeves 400 may serve similar function as the interstitial material 300, specifically to electrically isolate battery cells 100 from each other (and other electrical components), thermally isolate battery cells 100 from each other (and other thermal components), and/or direct the discharge of any hot gases that result from the failure of a battery cell. Sleeve 400 may be a cylindrical sleeve having an inside surface conforming to an outer surface of the battery cell 100. The sleeve 400 may have an inner diameter the same, or even slightly smaller, than an outer diameter of the battery cells 100 so that the sleeve 400 may be press fit on the battery cell 100. The sleeve 400 may be attached to the battery cells 100 in any other suitable manner as well. The sleeve 400 may include gaps or spaces to allow electrical connection to the positive terminal 106 and the negative terminal 108 of the battery cell 100, for example, if the connection to the negative terminal is made to the side of a battery cell and not to the shoulder of the battery cell. Using sleeve 400 may allow for higher packing efficiency and reduce the amount of material necessary to provide the desired properties, such as electrical or thermal insulation, or directing hot-gas discharge in a certain direction.

In certain embodiments, sleeve 400 and interstitial material 300 may occur together. For instance, a sleeve 400 may be disposed around one or more battery cells (for example all of the battery cells, or less than all but sufficient to provide the necessary function), to provide thermal insulation, electrical insulation, and/or direct the discharge of failed cells. If the sleeve does not provide all the desired properties, interstitial material 300 may be disposed in spaces between the battery cells 100 with sleeves (keeping in mind that not all battery cells need to have sleeves) by adding the interstitial material through ports in one or more side walls 204 of modular housing. Alternatively, the interstitial material may be added from the top, after battery cells have been placed into position within the modular housing, excluding the top plate.

Figure 5:
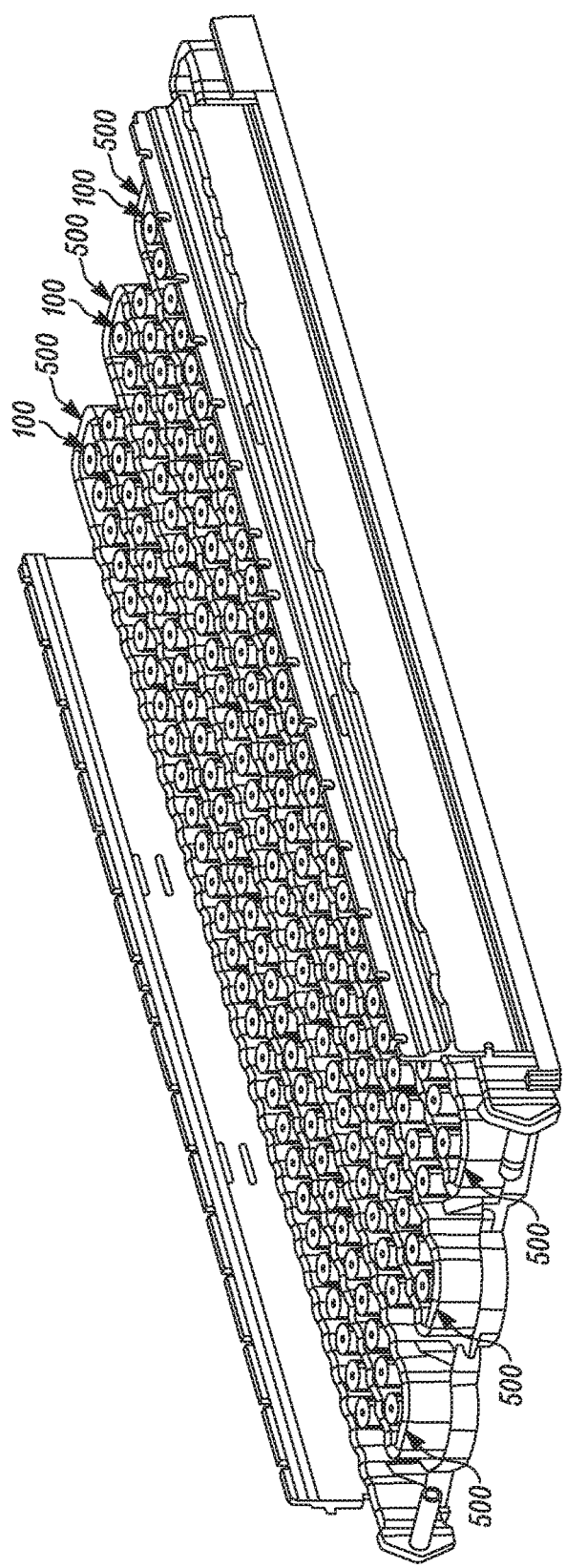
FIG. 5 illustrates cooling tubes between battery cells to provide cooling, according to certain embodiments of the invention.

FIG. 5 illustrates a cooling tube used to remove heat generated by battery cells according to certain embodiments. As shown in FIG. 5, cooling tubes 500 are arranged between rows of the battery cells 100. In other embodiments, multiple cooling tubes 500 may be provided between the battery cells 100. Any suitable arrangement of the cooling tubes 500 may be provided between the battery cells 100 as cooling demands require. The cooling tubes 500 remove heat from the battery cells 100 and help keep the temperature within acceptable limits. In certain embodiments, interstitial material 300, sleeves 400, and the cooling tubes 500 are used in combination within one another. For example, the cooling tubes 500 may be provided inside the module housing 200 to help cool the battery cells 100 and then the interstitial material 300 may be provided around the battery cells 100 and the cooling tubes 500 to help direct any discharge from a failed battery cell 100. Cooling tubes 500 preferentially have internal lumens (i.e., internal divided walls) that improve heat transfer. U.S. patent application Ser. No. 14/056,552 describes features of cooling tubes for thermal management as can be used within an energy storage system of the present invention. The entire disclosure of U.S. patent application Ser. No. 14/056,552 is incorporated herein by reference.

In other embodiments, instead of cooling tubes, heat pipes are disposed between the battery cells to remove generated heat. Heat pipes may be made by extruding tubes or other shapes of metal or another material that has a high thermal conductivity. During the extrusion process, small fins that function as capillaries are created. The extruded tube or other shape is filled with liquid, air is evacuated, and then the tube or other shape is sealed such that a liquid/gas mixture exists within the sealed tube or shape. Heat pipes provide cooling through the evaporative process in which liquid in thermal contact with hotter regions absorbs heat and may undergo a phase transformation from liquid to gas. The gas reaches a region cold enough to remove enough heat form the gas, the gas then condenses back to a liquid. The liquid may migrate back to the heat source with the help of capillary action from the fins formed during the extrusion process. U.S. patent application Ser. No. 14/189,219 describes additional features of heat pipes for thermal management within an energy storage system, the disclosure of which is incorporated herein by reference.

In certain embodiments, a cold plate (which provides liquid cooling) may be in thermal connection with the battery cells 100 to further remove heat generated during system use. The cold plate may be in direct thermal contact with the battery cells 100 or, alternatively, one or more layers and/or features may be between the cold plate and the battery cells 100. In certain embodiments, the battery cells 100 are in contact with one or more heat pipes to remove excess heat disposed under the battery cells. A cold plate is disposed below the heat pipe or pipes (on the side of the heat pipe away from the battery cells 100) that helps dissipate the heat contained in the heat pipe.

In certain embodiments, the cold plate may be in thermal contact with one side of the cells without any heat pipes disposed between the cells. The cold plate may physically consist of a single plate or multiple plates that are thermally connected to the cells and/or one another. In other embodiments, one or more heat pipes are disposed between the battery cells 100 and a cold plate is disposed below the battery cells 100. The heat pipes and the cold plate may be in thermal connection with one another.

Figure 13A:
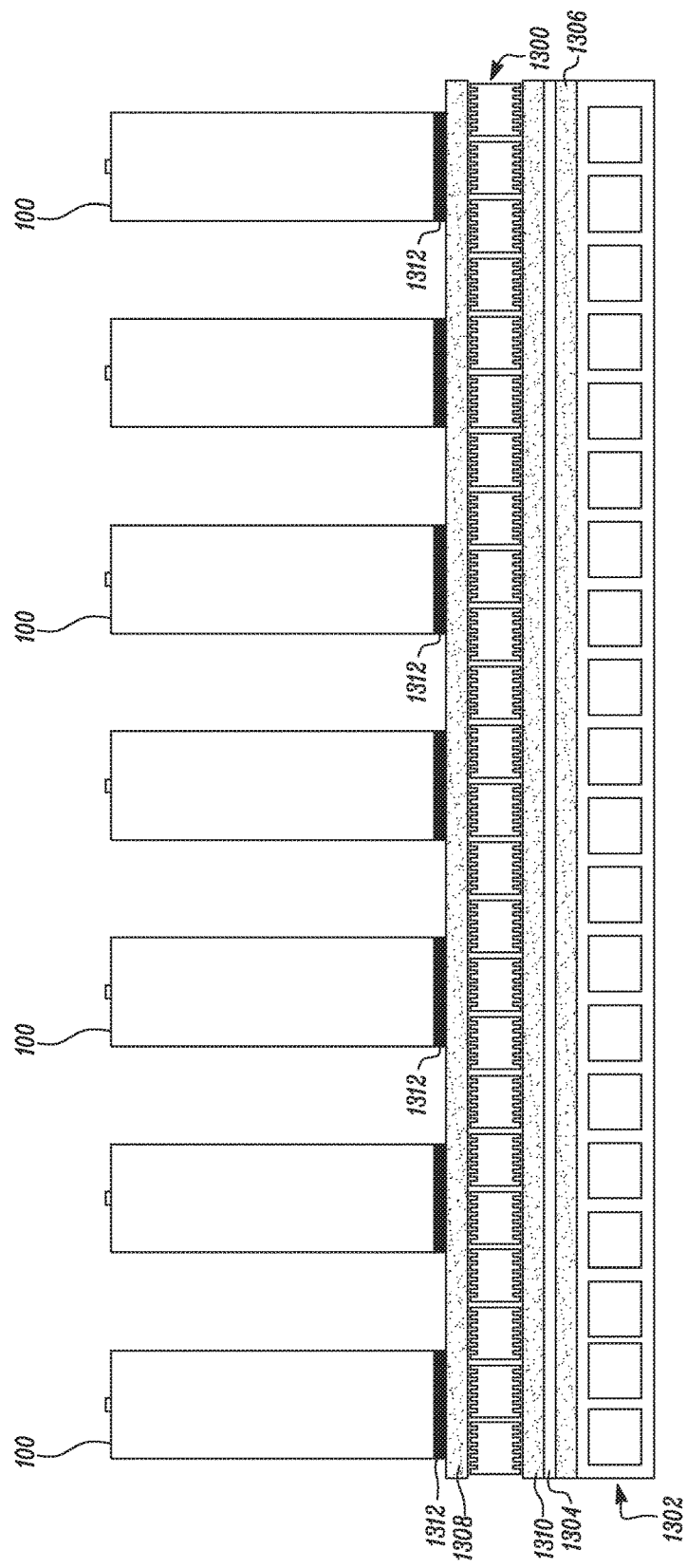
FIG. 13A illustrates cooling elements within an energy storage system according to certain embodiments of the invention.
Figure 13B:
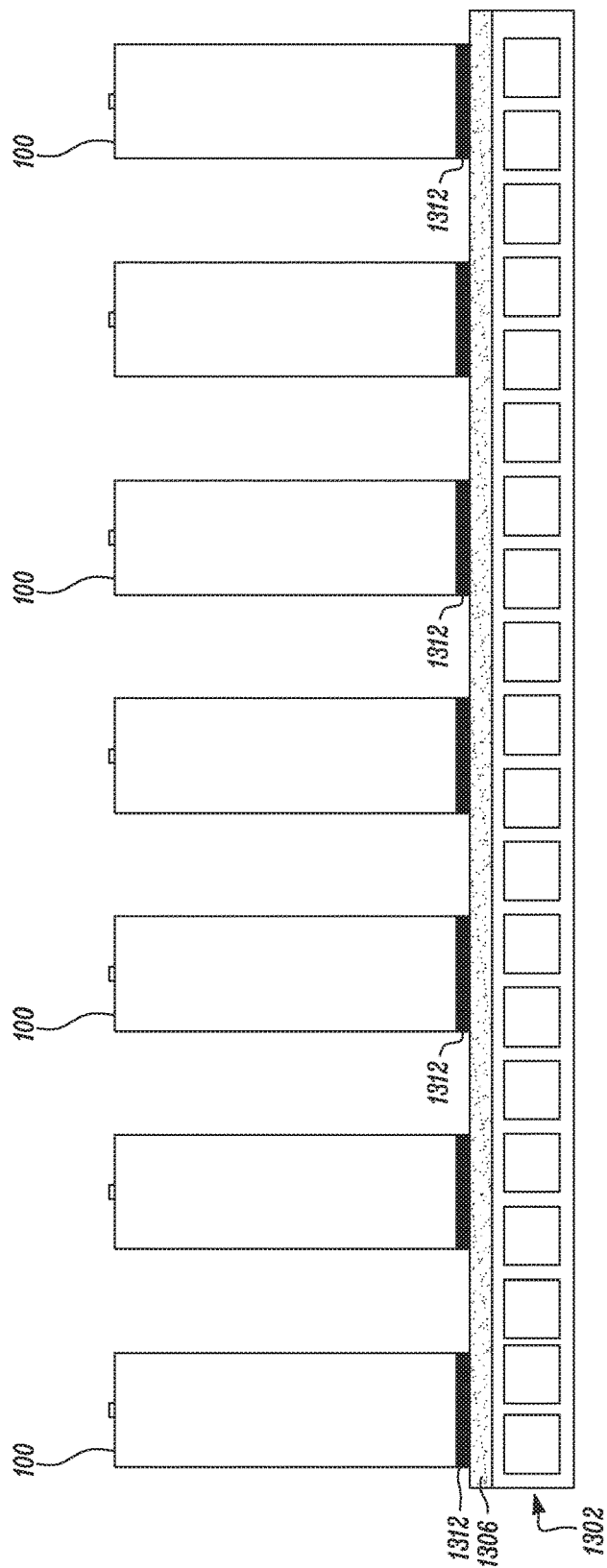
FIG. 13B illustrates a cold plate within an energy storage system according to certain embodiments of the invention.

Additional details of embodiments that incorporate heat pipes and cold plates are described with reference to FIGS. 13A and B. FIGS. 13A and 13B illustrate one or more cooling elements with an energy storage system according to certain embodiments. FIG. 13A illustrates an energy storage system with a heat pipe 1300 and cold plate 1302. In the embodiments illustrated in FIG. 13A, heat generated by the battery cells 100 is removed using both heat pipe 1300 and a cold plate 1302. Adhesive layer 1304 bonds heat pipe 1300 and cold plate 1302. As shown in FIG. 13A, heat pipe 1300 is coated with a dielectric coating layer on each side, and cold plate 1302 is coated with a dielectric coating layer on the side closest to cold plate 1302. When the heat pipe 1300 and cold plate 1302 are coated with dielectric coating layers as shown in FIG. 13A, adhesive layer 1304 bonds directly to dielectric coating layers 1306 and 1310. Similarly, adhesive layer 1312 bonds the battery cells to heat pipe 1300. As shown in FIG. 13A, adhesive layer bonds 1312 bonds directly battery cells 100 and to dielectric coating layer 1308 on heat pipe 1300. Adhesive layers 1304 and 1312 preferentially comprise an adhesive with a high thermal conductivity that are dielectrics, although the adhesive layer may comprise any type of adhesive that provides the necessary adhesive force between the elements to be bonded (for example, between heat pipe 1300 and the cold plate 1302). Cold plate 1302, which is thermally coupled to the heat pipe 1300, removes heat from the heat pipe as shown in FIG. 13A and directly from battery cells as shown in FIG. 13B.

In certain embodiments, one or more of the dielectric coating layers may be omitted. When a dielectric coating layer is not present, adhesive layer 1304 or adhesive layer 1312 may bond directly to either the heat pipe or cold plate. For example, if dielectric coating layer 1306 is not present, then adhesive layer 1304 would bond directly to cold plate 1302 but to heat pipe 1300 through dielectric coating layer 1310. In alternate embodiments, additional layers may be present between the heat pipe and cold plate or the heat pipe. Additional layers may also be present between the heat pipe and battery cells. In other embodiments, one or more of the adhesive layers 1304 and 1312 may be omitted.

FIG. 13B illustrates an embodiment with the cold plate thermally connected to battery cells without a heat pipe. As shown in FIG. 13B, cold plate 1302 is coated with dielectric coating layer 1306. The battery cells 100 are bonded to the cold plate through the dielectric coating layer 1306 using adhesive 1312. As described above, the dielectric coating layer may be omitted, in which case the battery cells are directly bonded to the cold plate using adhesive. Also, in certain embodiments, additional layers are present.

Figure 6:
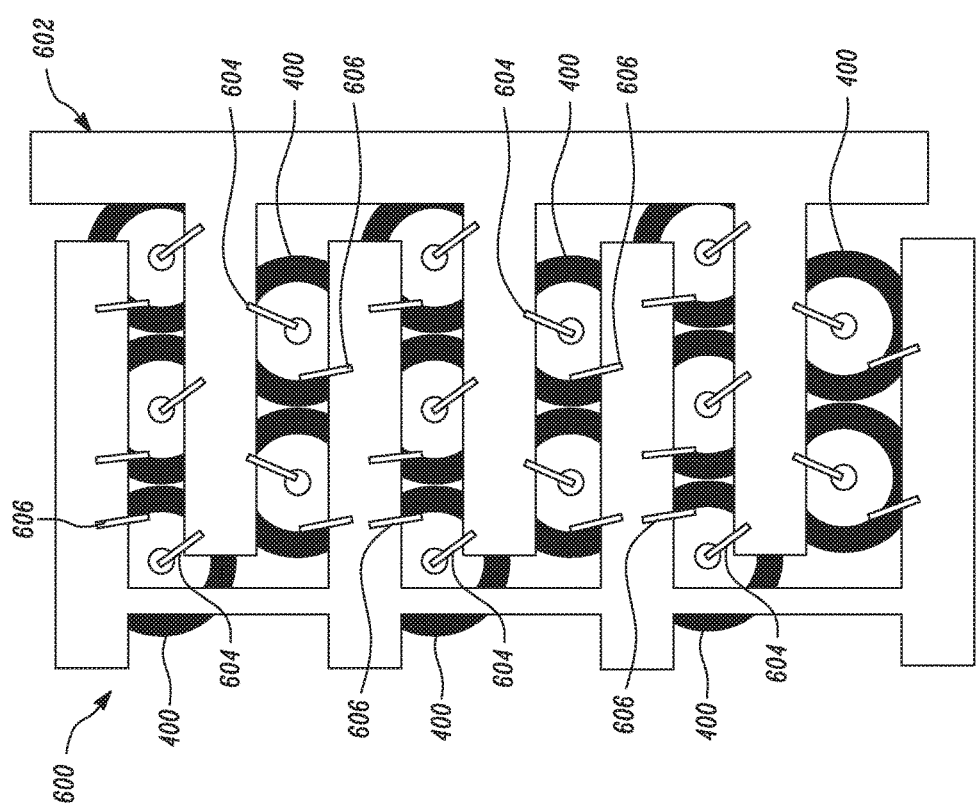
FIG. 6 illustrates a first interconnect and a second interconnect positioned over the battery cells, according to certain embodiments of the invention.

FIG. 6 illustrates a first interconnect 602 and a second interconnect 600 positioned over the battery cells 100. Although, the battery cells 100 are shown along with the sleeve 400, it should be understood that the battery cells 100 may also be provided without the sleeves 400. The first and second interconnects 602 and 600 may be plates of metal. Further, an underside of the first and second interconnects 602, 600 (that is the side closer to the battery cells 100) is preferably electrically insulated so as to not form unintended electrical connections through the contact of the first and second interconnects 602, 600 with a cell terminal. As shown in FIG. 6, the electrical connections are made using first and second cell connectors 604, 606.

The first and second interconnects 602 and 600 are used to charge and discharge the battery cells 100 during operation of the energy storage system. The first interconnect 602 (or set of interconnects) is connected to the positive terminals 106 the battery cells 100 and the second interconnect 600 (or set of interconnects) is connected to the negative terminals 108 of the battery cells 100. The first cell connector 604 connects the positive terminal 106 of each battery cell 100 to the first interconnect 602. The first cell connector 604 may be a wire or another electrical connection and is connected to the positive terminal 106 of the battery cell 100. The second cell connector 606, which may also be a wire or other electrical connection, connects the negative terminals 108 of the battery cells 100 to the second interconnect 600. The second cell connector 606 may be connected to any portion of the negative terminal 108 of the battery cell 100. The negative terminal 108 of the battery cell 100 may run from the end away from the positive terminal 106, up the side of the battery cell 100, and even around to the side of the positive terminal 106, that is on the "shoulder" of the first end 102. The negative terminal may even be disposed significantly on the first end 102, provided that the positive and negative terminals are electrically isolated from one another. The second cell connector 606 may contact the negative terminal of the battery cell 100 on the shoulder of the battery cell 100. In alternate embodiments, the positive and negative terminals could be switched.

As shown in FIG. 6, the positive terminals 106 of the battery cells 100 are connected to the first interconnect 602 through the multiple first cell connectors 604 and all the negative terminals 108 of the battery cells 100 are connected to the second interconnect 600 through the multiple second cell connectors 606. That is, all of the battery cells 100 shown in FIG. 6 are electrically connected in parallel. A group of the battery cells 100 that are electrically connected in parallel may be electrically connected to another group of the battery cells 100 in series.

The first and second interconnects 602 and 600 lie in same horizontal plane above the battery cells 100. The first cell connector 604 and the second cell connector 606 may protrude slightly above the first and second interconnects 602 and 600. The first and second interconnects 602 and 600 may also include grooves etc. to accommodate the first and second cell connectors 604, 606 in the same horizontal plane in which the first and second interconnects 602 and 600 lie. In certain embodiments, the top plate 900 (shown in FIG. 9) comprises a feature that allows the first and second cell connectors 604, 606 to protrude upward from the battery cell 100. For example, the top plate 900 may have material removed such that the first and second interconnects 602 and 600 may protrude uninhibited. In other embodiments that include one or more sleeves 400, the sleeves 400 may include gaps or spaces to allow the first and second interconnects 602 and 600 to be connected to the positive and negative terminals 106, 108 respectively without inhibiting the top plate 900 from being placed over the battery cells 100.

Figure 7:
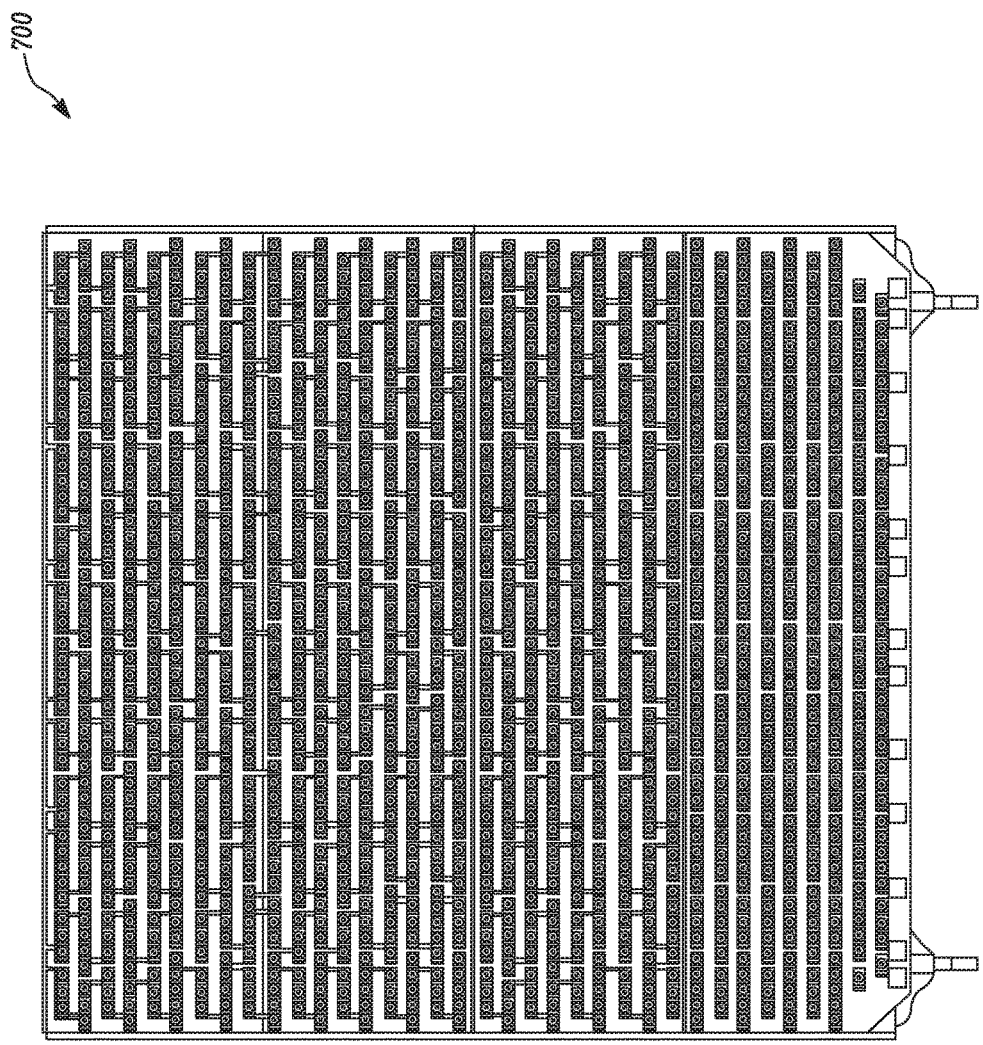
FIG. 7 illustrates an interconnect layer, according to certain embodiments of the invention.

FIG. 7 illustrates another embodiment of the present disclosure in which the first and the second cell connectors 604 and 606 are formed in the same plane as the first and second interconnects 602 and 600. This physical interconnect layer 700 includes a connection means for both the positive terminal 106 and the negative terminal 108 of the battery cells 100. The connection means may be a portion of a metal sheet, the metal sheet including cell connectors and an interconnect (or set of interconnects). Like in the embodiments described with reference to FIG. 6, the interconnects may contain an electrical insulation layer to prevent unintended electrical connections. Electrical insulation may either be removed, or not present, in the regions where an electrical connection to the positive terminal 106 or the negative terminal 108 is made. Blocks of the battery cells 100 may be connected in parallel with one another and also connected in series.

Figure 8:
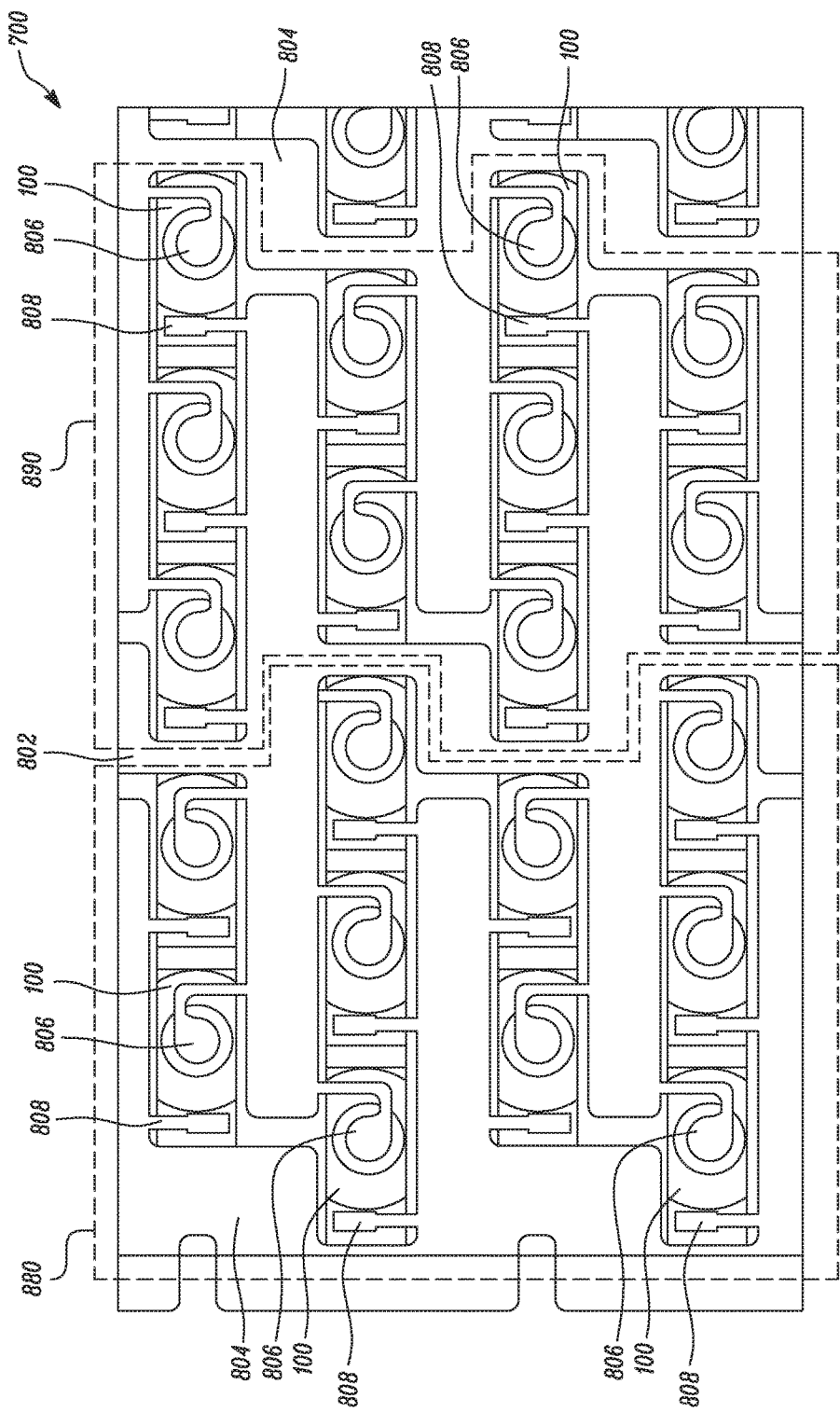
FIG. 8 illustrates a detailed view of a portion of the interconnect layer, according to certain embodiments of the invention.

FIG. 8 illustrates further structural details of the interconnect layer 700. The interconnect layer 700 may connect both the positive terminal 106 and the negative terminal 108 of the battery cells 100. The interconnect layer includes a positive interconnect 802 and a negative interconnect 804. The positive interconnect 802 connects the positive terminals 106 of the battery cells 100 with the interconnect layer 700 and the negative interconnect 804 connects the negative terminals 108 of the battery cells 100 with the interconnect layer 700.

The positive interconnect 802 connects the positive terminals 106 of the battery cells 100 at multiple first connection points 806. Similarly, the negative interconnect 802 connects the negative terminal 108 of the battery cells 100 at multiple second connection points 808. The first connection point 806 and the second connection point 808 may be integrated portions of the positive interconnect 802 and the negative interconnect 804 respectively. The first connection points 806 and the second connection points 808 typically lie in same horizontal plane as of the positive and negative interconnects and may be formed from the same material as the interconnects. The positive interconnects 802 and the negative interconnects 804 may also be formed from the same material.

For example, as shown in FIG. 8, current may flow from left to right. The battery cells 100 on the left side may be electrically connected in parallel with one another and then connected in series with the battery cells 100 to the right. As shown in FIG. 8, blocks of the battery cells 100 are defined through dashed lines 880, 890. The battery cells 100 shown within the dashed lines 880 are electrically connected in parallel with each other. This group of the battery cells 100 is then connected in series with the group of the battery cells 100 shown within the dashed lines 890. The group of the battery cells 100 within the dashed lines 890 is connected in parallel with each other. This description is explanatory only; other configurations of with different number of battery cells 100 in series and parallel are possible as well.

Figure 9A:
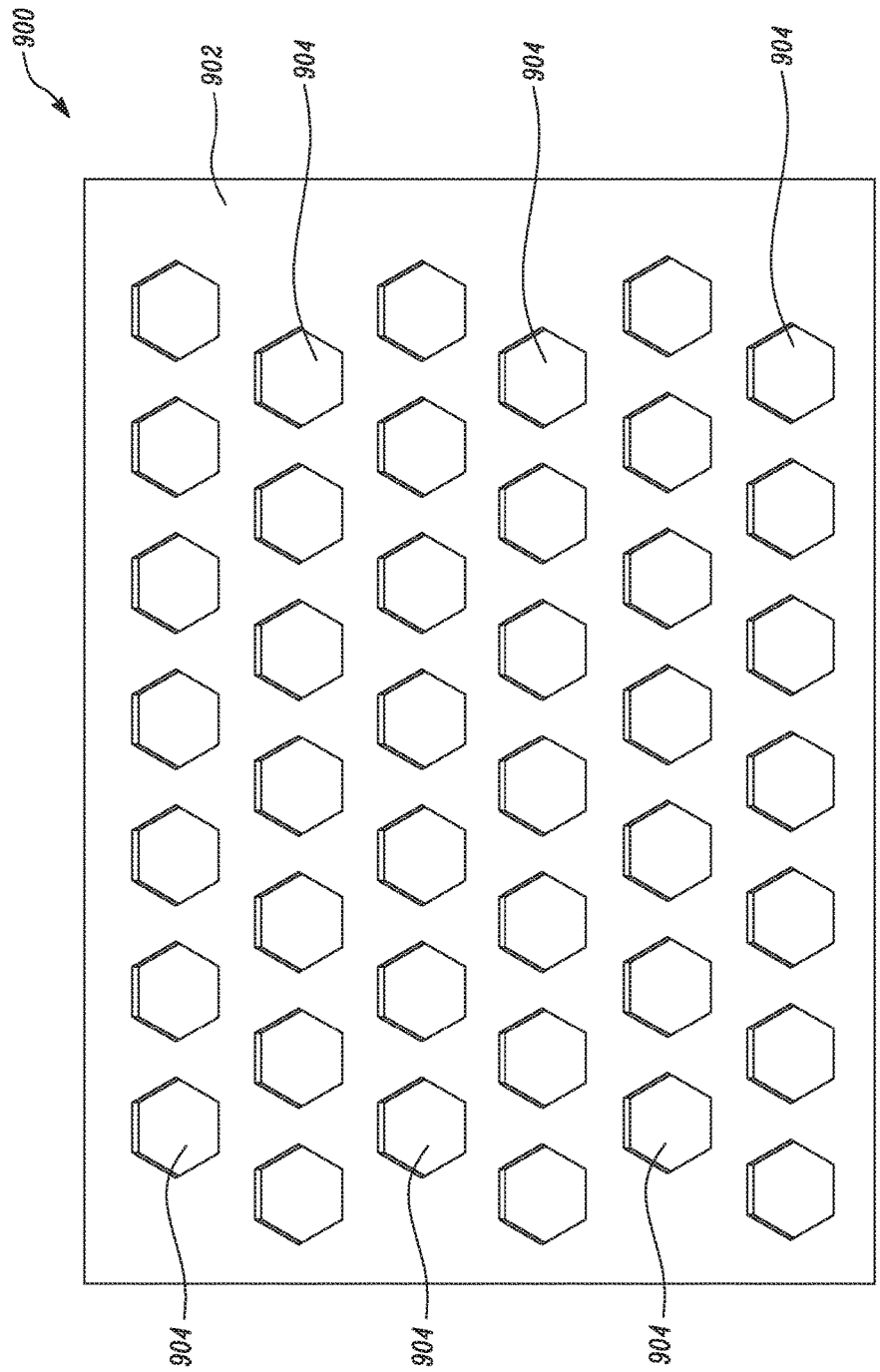
FIG. 9A illustrates a top plate of the energy storage system having hexagonal weak areas, according to certain embodiments of the invention.
Figure 9B:
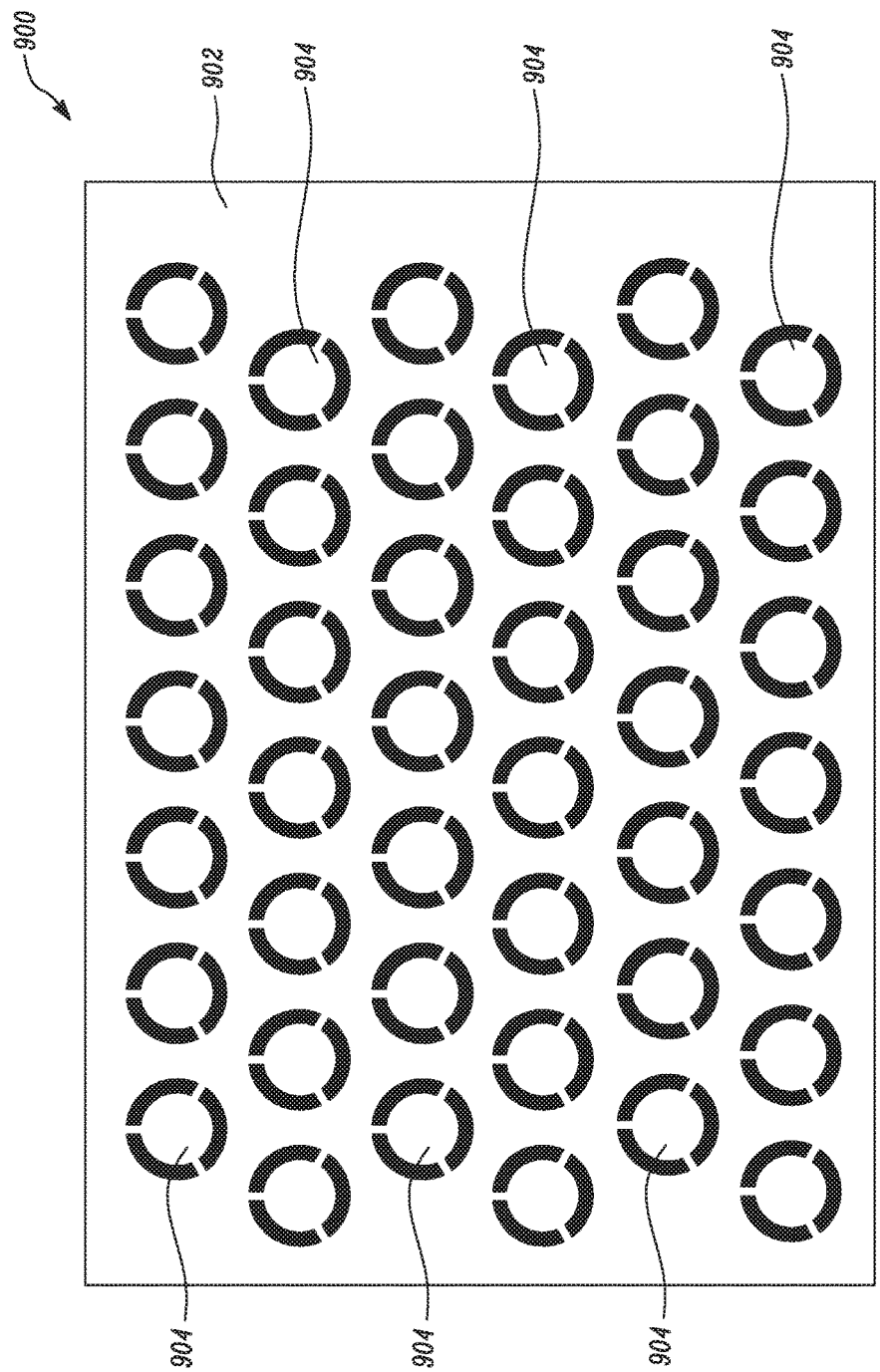
FIG. 9B illustrates the top plate of the energy storage system having circular weak areas, according to certain embodiments of the invention.
Figure 9C:
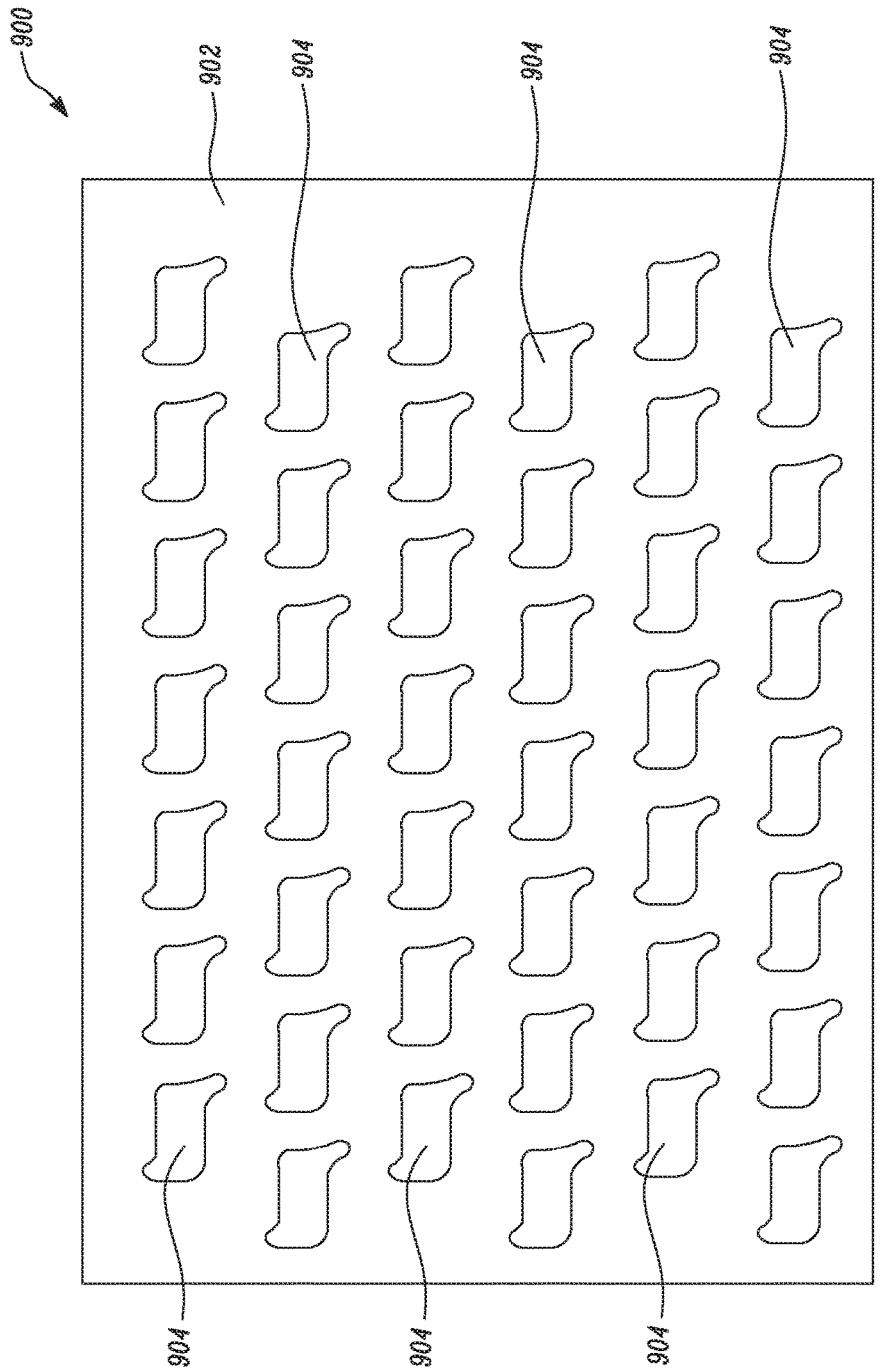
FIG. 9C illustrates the top plate of the energy storage system having polygonal weak areas, according to certain embodiments of the invention.

The top plate 900 is placed over the first and second interconnects 602 and 600. FIG. 9A-9C illustrate structural details of the top plate 900. The top plate 900 includes multiple weak areas 904. In certain embodiments, the interior side 902 contains the multiple weak areas 904 positioned above the battery cells 100. In other embodiments, the weak areas 904 may be on the exterior portion of the top plate. The number of the weak areas 904 on the interior side 902 of the top plate 900 may vary as per the application requirements. The weak areas 904 are structurally weaker portions of the top plate 900. The weak areas 904 may have any suitable geometry as per the need of the present invention, including a hexagonal geometry, a circular geometry, or an irregular geometry to accommodate other features or elements of the energy storage system.

For example, as shown in FIG. 9A, the weak areas 904 have a hexagonal geometry. As shown in FIG. 9B, the weak areas 904 have a circular geometry with portion of material removed along the circumference. The portion of material removed may be notches provided along the circumference. In other embodiments, the weak areas 904 may have an irregular polygon geometry, such as the geometry shown in FIG. 9C to accommodate the first and second cell connectors 604 and 606 to the positive terminal 106 and the negative terminal 108.

The weak areas may be used to direct hot gases when a battery cell fails and expels its contents. The weak areas help direct the hot gases to desirable discharge locations, and more importantly away from less desirable areas such as the other battery cells. The hot gases are typically caustic and may cause other battery cells to fail if sufficient amounts of the caustic gasses are exposed to the other cells. Creating weak areas helps direct the caustic gases away from the other battery cells 100 and minimize damage from the failure of a battery cell.

The top plate 900 is designed to allow the gases from a failed battery cell to be expelled once the weak area 904 above the failed cell ruptures. The weak area preferentially ruptures because of the increased pressure from the gases and/or the caustic gases impinging on the weaker areas causing rupture. Once rupture occurs, the gases may be expelled external to the modular housing.

Top plate 900 with weak areas 904 may be manufactured in different ways. For example, the top plate 900 may be prepared from a single material. A portion of material may be removed from the top plate 900 at the intended position of the weak areas 904 such that a thickness of the top plate 900 is lesser at the weak areas 904 as compared to a thickness of the top plate 900 at other locations. Therefore, the weak areas 904 may be groves or structural depressions on the interior side 902 of top plate 900. Alternatively, the weak areas 904 may be grooves or structural depressions on the exterior side of top plate 900.

In another embodiment, top plate 900 may comprise a thick or structural layer and has an opening above each battery cell. The openings may be any shape that would allow for gas to be expelled when a battery cell fails and may be shaped to provide space for other components, such as protruding interconnects or cell connectors. A thin layer, such as a thin layer of mica, may then be bonded (or otherwise added) to the thick or structural layer. The thin layer covers the openings in the thick or structural layer. This thin layer should be thin enough to rupture when the pressure builds up from a failed battery cell. The thin layer preferentially only ruptures over the failed battery cell, leaving the remaining cells (that have not failed) covered. The thick or structural layer, may be bonded to the thin layer through various means including a suitable adhesive, by bonding the layers with the aid of heat, or any other means suitable for the materials that comprise the material of top plate 900.

In other embodiments, the weak areas 904 are formed on the top plate 900 by manufacturing the top plate 900 by a composite material. For example, the top plate 900 may be manufactured by a mica layer having a steel mesh on top. The steel mesh may afterwards be removed from the portions of the top plate 900 which are intended to be the weak areas 904, leaving only mica above the battery cells 100. Thus, the weak areas 904 are rendered structurally weaker and in case of application of a force such as by the hot gases coming out of the failed battery cells 100, the top plate 900 fails at the weak areas 904. The methods of manufacture, and compositions of, the top plate 900 described herein are merely exemplary in nature and any variations in the material as well as manufacturing processes may be made as per application requirements. Top plate 900 may comprise other materials including metal (with added electrical insulation to prevent any unwanted electrical), ceramic, metal with mica, fire retardant composites, plastics, or any other material that can provide the necessary structural insulating properties.

FIG. 10 illustrates an expanded view of an energy storage system 1000 showing various components. The module housing 200 typically includes the base 202 and the four side walls 204, but one or more elements, such as a side wall 204, may be removed. The module housing 200 is generally electrically isolated from the housed battery cells 100. This may occur through physical separation or through an electrically insulating layer. In certain embodiments, the base 202 comprises an electrically insulating layer on top of a metal sheet. In other embodiments, the base 202 is formed from a nonconductive or electrically insulating material, such as polypropylene, polyurethane, polyvinyl chloride, another plastic, a nonconductive composite, or an insulated carbon fiber. Side walls 204 may also contain an insulating layer or be formed out of a nonconductive or electrically insulating material, such as polypropylene, polyurethane, polyvinyl chlorine, another plastic, a nonconductive composite, or an insulated carbon fiber.

According to specific embodiments of this invention, the side walls 204 include protrusions 1002 which may fit in holes 1004 provided in the base 202 to couple the side walls 204 to the base 202. The battery cells 100 are placed on the base 202 in a pre-determined positional arrangement as per the application requirements for which the energy storage system 1000 is to be used. The interconnect layer 700 including the first interconnect 602 and the second interconnect 600 is positioned above the battery cells 100. The top plate 900 is positioned over the interconnect layer 700. The top plate 900 may either be a single plate or the top plate 900 may include multiple top plates 900 as illustrated. The multiple top plates 900 may be coupled with each other in any suitable manner as per the scope of the present invention. The top plate 900 includes an exterior side 1006 which is planar as opposed to the interior side 902 having structural depressions.

Figure 11:
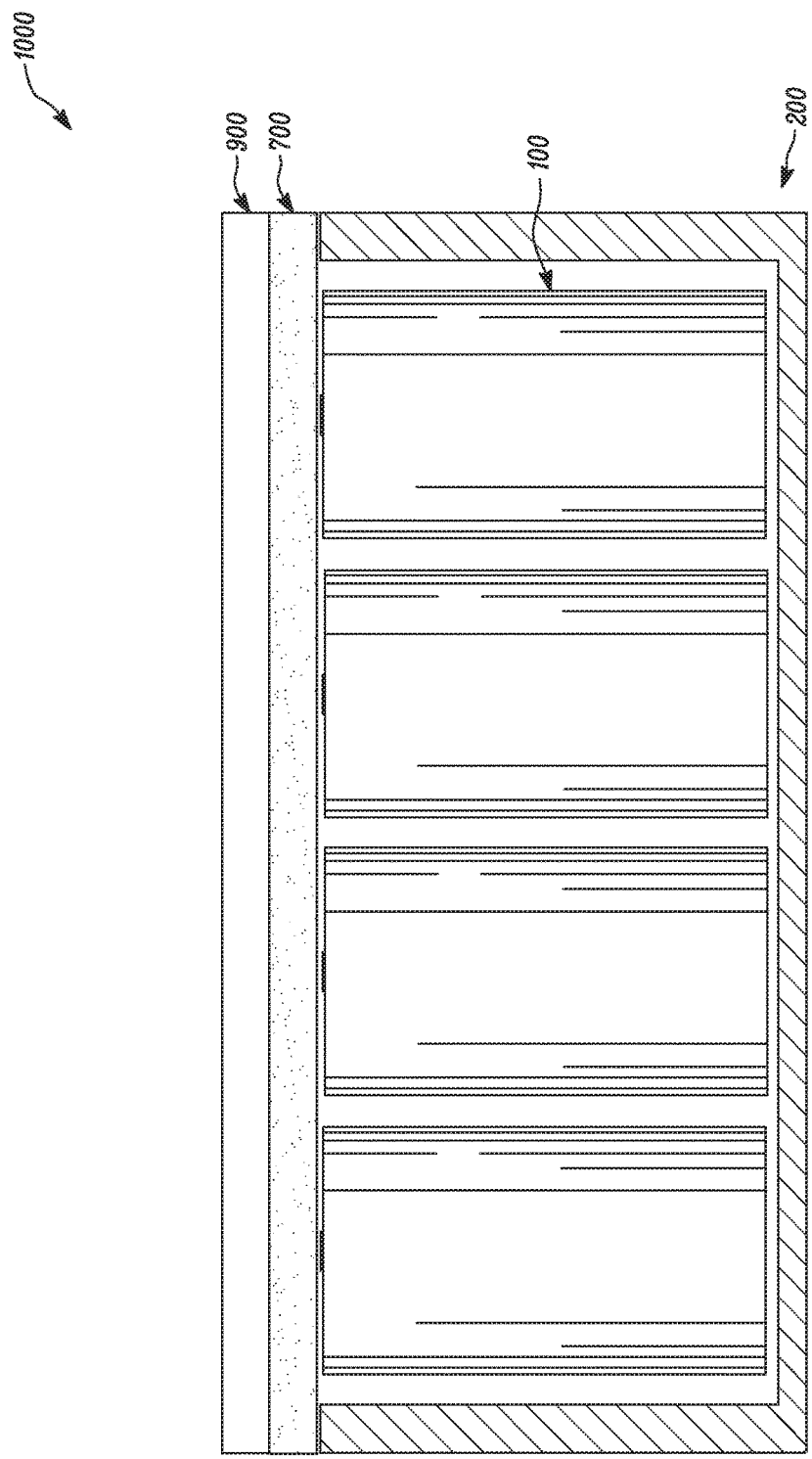
FIG. 11 illustrates a side view of the energy storage system, according to certain embodiments of the invention.

FIG. 11 illustrates a side view of the energy storage system 1000. Dimensions of the module housing 200, the interconnect layer 700 and the top plate 900 are such that the battery cells 100 are efficiently packaged inside the module housing 200 and the interconnect layer 700 is in contact with the positive terminals 106 and negative terminals 108 of the battery cells 100. The interconnect layer 700 and the top plate 900 have similar dimensions. The module housing 200 has length and width dimensions matching the corresponding dimensions of the interconnect layer 700 and the top plate 900. The base 202 and the side walls 204 of the module housing 200 accordingly have appropriate dimensions.

Figure 12:
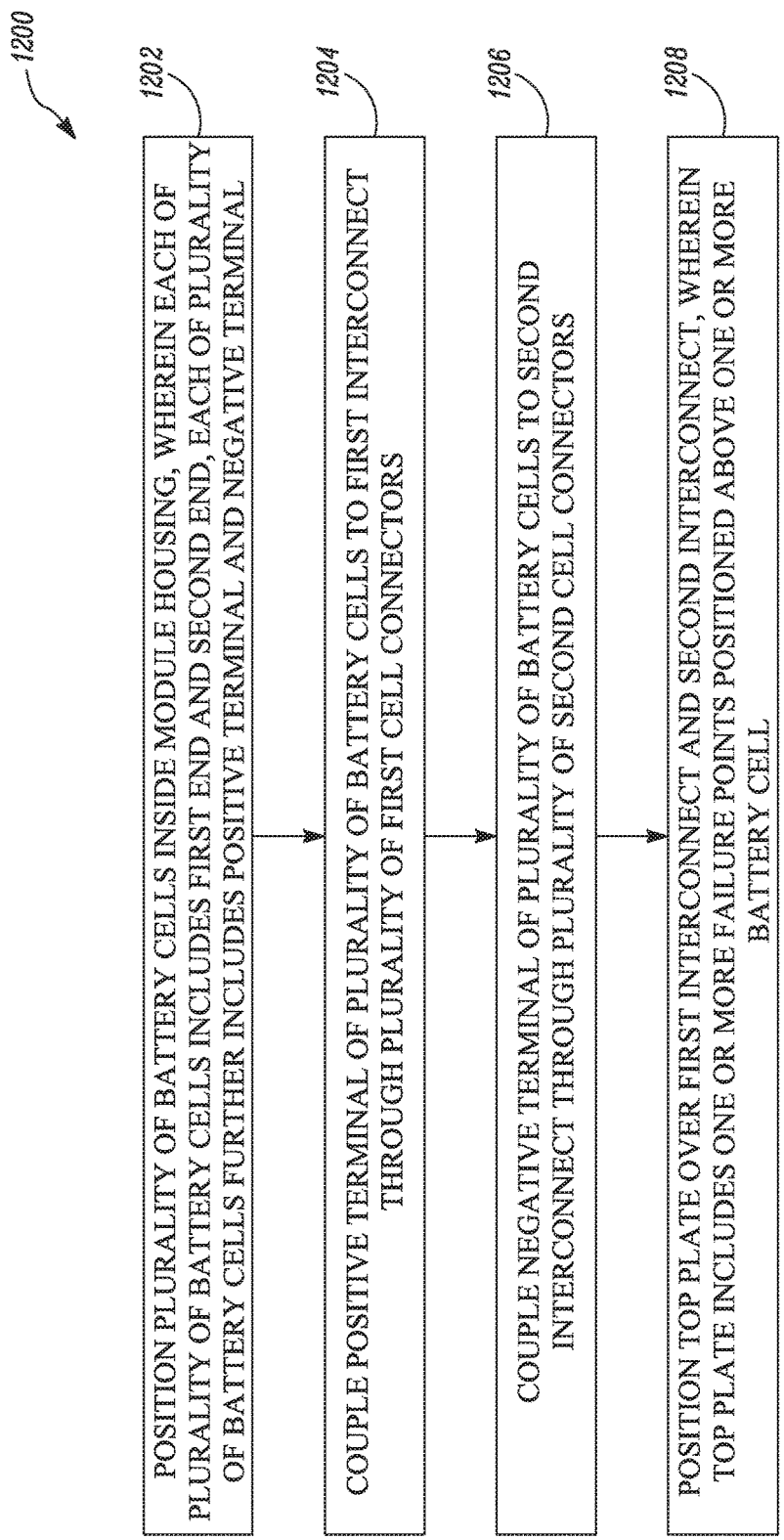
FIG. 12 illustrates a method of assembling the energy storage system, according to certain embodiments of the invention.

FIG. 12 illustrates a method 1200 to create an energy storage system 1000 according to certain embodiments. The energy storage system 1000 includes the module housing 200. According to method 1200, at step 1202 battery cells 100 are positioned inside the module housing 200. The battery cells 100 have the first end 102 and the second end 104. Each battery cell 100 include a positive terminal 106 and a negative terminal 108. The battery cells 100 may be positioned at a pre-determined position defined by the slots or any other such means on the base 202 of the module housing 200 or alternatively though a computer-assisted mechanism, as would be known to those or skill in the art, to use a datum on the module housing to properly locate the cells. At step 1204, the positive terminals 106 of the battery cells 100 are coupled to the first interconnect 602 through the multiple first cell connectors 604. The first cell connectors 604 may be any suitable electrical joining means such as wires. At step 1206, the negative terminal 108 of the battery cells 100 are coupled to the second interconnect 600 through the multiple second cell connectors 606. The second cell connectors 606 may be any suitable electrical joining means such as wire.

Alternatively, the connections to the positive and negative terminals may be coupled to the interconnect layer 700 through first interconnects 602 and second interconnects 600 that all lie in the same horizontal plane. At step 1208, the top plate 900 is positioned over the first interconnect 602 and the second interconnect 600. The top plate 900 includes the one or more weak areas 904 above the one or more battery cells 100. The weak areas 904 are structurally weaker portions of the top plate 900.

The top plate 900 may be manufactured according to different techniques and from different materials to produce the weak areas 904. For example, the top plate 900 may be formed from a single material. A portion of material may be removed from the top plate 900 at the intended position of the weak areas 904 such that a thickness of the top plate 900 is lesser at the weak areas 904 as compared to a thickness of the top plate 900 at other locations. Thus, the weak areas 904 may be groves or structural depressions on the interior side 902 of the top plate 900. The weak areas 904 may be groves or structural depressions on the exterior side of the top plate 900. Other ways as described herein and as would be known to persons of skill in the art to form weak areas may be used.

Method 1200 may further include positioning the interstitial material 300 between the battery cells 100. Interstitial material 300 can provide electrical insulation and/or thermal insulation to the battery cells 100. The interstitial material can also direct cell discharge from a failed battery cell. Method 1200 may also include positioning a sleeve 400 around one or more battery cells 100. The sleeve may be used either in place of or in conjunction with any interstitial material. Method 1200 may also include positioning cooling tubes 500 between the battery cells 100 to provide cooling to the battery cells. Further, method 1200 may include positioning one or more cold plates in thermal connection with the battery cells to dissipate heat. The one or more cold plates may be positioned on the base 202 of module housing 200, or alternatively instead of the base 202. When the cold plate is placed on top of the base 202, or instead or base 202, the battery cells are positioned on top of the cold plate instead of base 202 at step 1202. Alternatively, battery cells could be thermally connected to one or more heatsinks. Heat may then be removed by circulating ambient or chilled air around the heat sink.

The method 1200 may include positioning any combination of the interstitial material, sleeves, heat pipes, and/or cooling tubes. The interstitial material 300 may be added after the battery cells 100 are within the module housing 200. For example, the interstitial material 300 may be added through ports in the side wall 204. The interstitial material 300 may also be added from the top prior to assembly of the first and second interconnects 602, 600 and the top plate 900.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, a person of ordinary skill in the art will recognize that changes may be made in form and detail without departing from the scope of the present disclosure. Thus, the present disclosure is limited only by the claims.

In the foregoing specification, the disclosure has been described with reference to specific embodiments. However, as one skilled in the art will appreciate, various embodiments disclosed herein can be modified or otherwise implemented in various other ways without departing from the spirit and scope of the disclosure. Accordingly, this description is to be considered as illustrative and is for the purpose of teaching those skilled in the art the manner of making and using various embodiments of the disclosed air vent assembly. It is to be understood that the forms of disclosure herein shown and described are to be taken as representative embodiments. Equivalent elements, materials, processes or steps may be substituted for those representatively illustrated and described herein. Moreover, certain features of the disclosure may be utilized independently of the use of other features, all as would be apparent to one skilled in the art after having the benefit of this description of the disclosure. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

Further, various embodiments disclosed herein are to be taken in the illustrative and explanatory sense, and should in no way be construed as limiting of the present disclosure. All joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

Additionally, all numerical terms, such as, but not limited to, "first", "second", "third", "primary", "secondary", "main" or any other ordinary and/or numerical terms, should also be taken only as identifiers, to assist the reader's understanding of the various elements, embodiments, variations and/or modifications of the present disclosure, and may not create any limitations, particularly as to the order, or preference, of any element, embodiment, variation and/or modification relative to, or over, another element, embodiment, variation and/or modification.

It will also be appreciated that one or more of the elements depicted in the drawings/figures can also be implemented in a more separated or integrated manner, or even removed or rendered as inoperable in certain cases, as is useful in accordance with a particular application.

LIST OF ELEMENTS

100 Battery cell
102 First end
104 Second end
106 Positive terminal
108 Negative terminal
110 Surface
112 Insulating region
200 Module housing
202 Base
204 Side wall
300 Interstitial material
400 Sleeve
500 Heat pipe
600 Second interconnect
602 First interconnect
604 First cell connector
606 Second cell connector
700 Interconnect layer
802 Positive interconnect
804 Negative interconnect
806 First connection point
808 Second connection point
880 Dashed line
890 Dashed line
900 Top plate
902 Interior side of the top plate
904 Weak areas
1000 Energy storage system
1002 Protrusion
1004 Hole
1006 Exterior side of the top plate
1200 Method
1202 Step
1204 Step
1206 Step
1208 Step
1300 Heat pipe
1302 Cold plate
1304 Adhesive layer
1306 Coating layer
1308 Coating layer
1310 Coating layer
1312 Adhesive

What is claimed is:

1. An energy storage system comprising:
a module housing;
a plurality of battery cells positioned inside the module housing, each of the plurality of battery cells including a first end and a second end, each of the plurality of battery cells further including a positive terminal and a negative terminal;
a first interconnect positioned over the plurality of battery cells;
a second interconnect positioned over the plurality of battery cells;
a plurality of first cell connectors connecting the positive terminals of the battery cells to the first interconnect;
a plurality of second cell connectors connecting the negative terminals of the battery cells to the second interconnect; and
a top plate comprising an interior side and an exterior side and positioned over the first interconnect and the second interconnect, wherein the top plate includes one or more weak areas positioned above the first end or the second end of one or more battery cells of the plurality of battery cells, further wherein the top plate comprises material that has been modified to reduce integrity of the top plate in the one or more weak areas.

2. The energy storage system of claim 1, wherein the weak areas in the top plate are physically weaker portions of the top plate.

3. The energy storage system of claim 2, wherein the weak areas are structural depressions in the top plate such that the structural depressions are on the interior side of the top plate and the exterior side is planar.

4. The energy storage system of claim 2, wherein the top plate is prepared from a single material and a portion of material is removed from the weak areas.

5. The energy storage system of claim 2, wherein the top plate is prepared from a composite material.

6. The energy storage system of claim 1 wherein the first interconnect and the second interconnect are substantially coplanar.

7. The energy storage system of claim 1, wherein the first interconnect collects current from the positive terminals of the battery cells and the second interconnect collects current from the negative terminals of the battery cells.

8. The energy storage system of claim 1, further comprising interstitial material between the plurality of battery cells inside the module housing.

9. The energy storage system of claim 8, wherein the interstitial material is comprised of a silicone-based material.

10. The energy storage system of claim 1, further comprising a sleeve positioned around the plurality of battery cells.

11. The energy storage system of claim 1, further comprising a cold plate in thermal connection with the plurality of battery cells.

* * * * *